W. C. DYER.
ELEVATING MECHANISM FOR SHOP TRUCKS.
APPLICATION FILED FEB. 21, 1918.
1,373,552.
Patented Apr. 5, 1921.
2 SHEETS—SHEET 2.
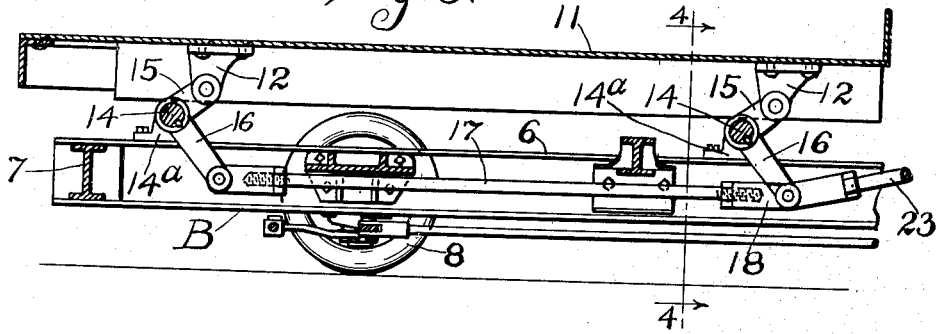
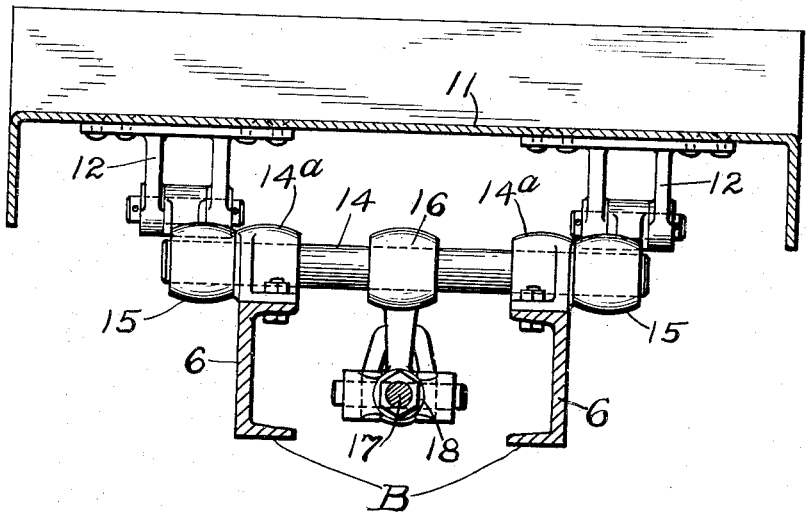

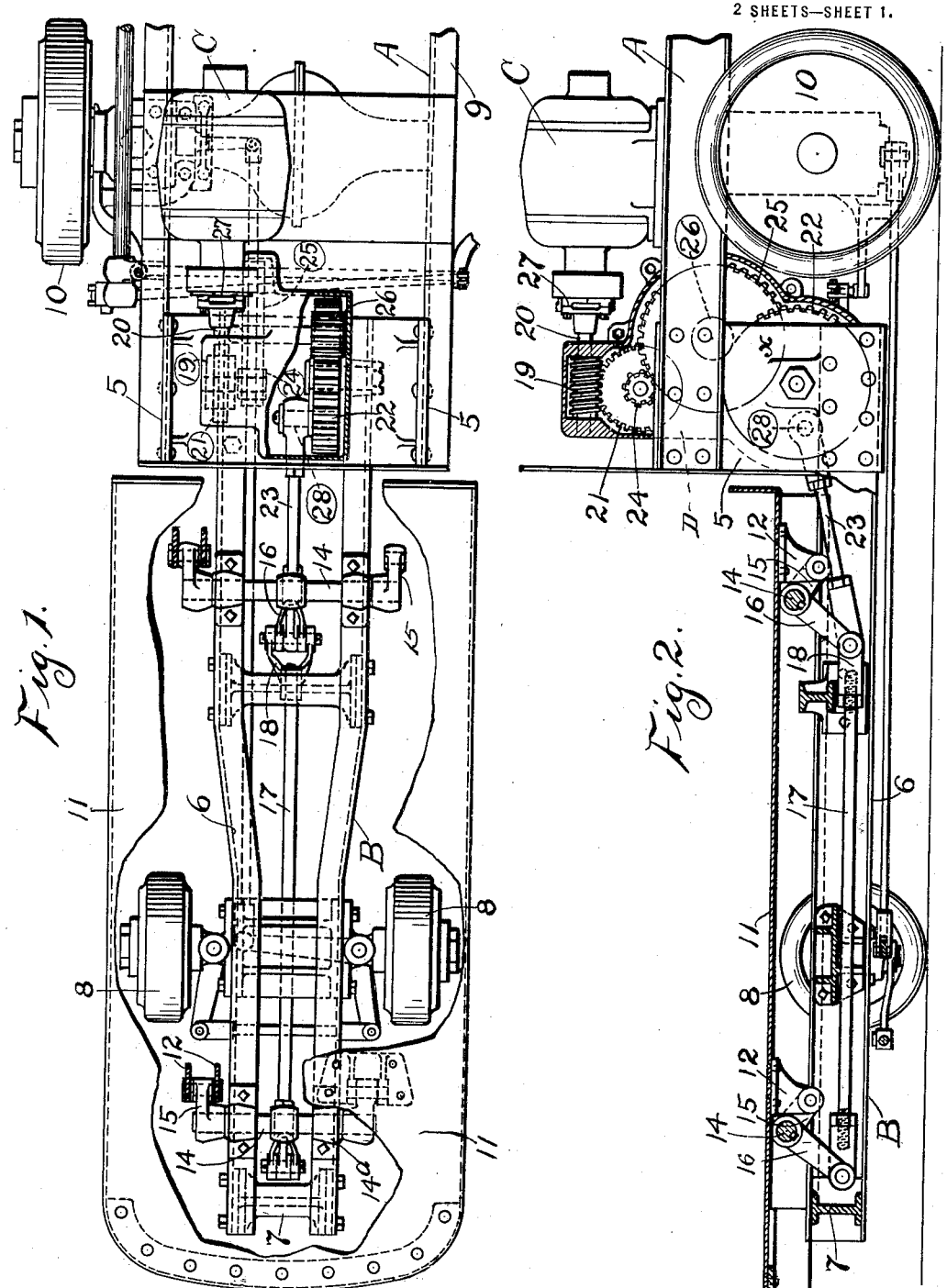

UNITED STATES PATENT OFFICE.

WALTER C. DYER, OF CHICAGO, ILLINOIS, ASSIGNOR TO BUDA COMPANY, A CORPORATION OF ILLINOIS.

ELEVATING MECHANISM FOR SHOP-TRUCKS.

1,373,552.       Specification of Letters Patent.       Patented Apr. 5, 1921.

Application filed February 21, 1918. Serial No. 218,454.

*To all whom it may concern:*

Be it known that I, WALTER C. DYER, a citizen of the United States, residing at Chicago, county of Cook, and State of Illinois, have invented certain new and useful Improvements in Elevating Mechanism for Shop-Trucks, of which the following is a specification.

My invention relates to shop trucks of the type employed in elevating by its own power immobile skips or storage platforms clear of the floor for transportation of the same and its load to any desired destination; and has for its primary objects; to improve the construction and increase the efficiency and utility of trucks of this type in regard to the elevating mechanism therefor; and to provide a compact and simple arrangement of power plant and elevating mechanism wherein the platform and its load may be readily raised to elevated position under complete control of the operator and then locked in a manner designed to avoid the transmission of load thrust to the power plant upon the completion of maximum platform movement, and the shutting off of the power; the parts being so arranged as to readily permit inspection, repair or replacement of the same. These together with such other objects as may hereinafter appear, or are incident to my invention, I attain by means of a construction illustrated in preferred form in the accompanying drawings, wherein—

Figure 1 represents a top plan of a truck embodying my invention, the platform being slightly broken away in order to disclose certain elements of the elevating mechanism; Fig. 2 is a central vertical section of the structure illustrated in Fig. 1, the platform being shown in its normal lowered position; Fig. 3 is a similar view of the platform or forward end of the truck, illustrating the raised or elevated position of the platform; and Fig. 4 represents an enlarged cross-sectional view taken on the line IV—IV of Fig. 3.

Referring to the drawings, the wheeled truck shown embodies a raised rear framework A and a front sub-framework B connected together by side plates 5; the front framework comprising longitudinal side frame members 6, cross pieces 7 and the front wheels 8; and the rear framework consisting of side frame members 9 which carry a motor C and which members are supported in turn by the side plates 5 and the rear wheels 10.

The reference numeral 11 designates an elevating platform mounted above the sub-framework B and is provided on its under face, toward its ends, with dependent bearing brackets 12. The numerals 16 indicate spaced crank levers, operating in each instance a shaft 14 mounted for rotary movement in brackets 14ª carried on the upper face of the frame members 6, said shaft terminally provided with work arms 15 pivotally connected with the brackets 12. The crank arms 16 are inclined forwardly and downwardly and disposed substantially at right angles to the arms 15 and extend intermediately and centrally of the frame members 6. The lower ends of both crank arms 16 are united by a connecting rod 17 by means of knuckle joints 18 which in each case have a pivot pin connection with the ends of the crank arms 16 in order to permit movement of the levers 15 to raise and lower the elevator platform.

From the description thus far made, it will be apparent that with the parts arranged as shown, a pull exerted upon the connecting rod will simultaneously operate the levers to elevate the platform, and it is intended that the pull or force exerted shall preferably move the work arms 15 through an angle of ninety degrees when moving from lowered to raised position. It is also obvious that opposite movement of the connecting rod will return the platform to its normal lowered position. One of the advantages attaching to this arrangement resides in the fact that although the platform itself may move on a short arc, with the axis of such movement in the shaft 14, yet the position of the platform when at maximum height is substantially that of the platform when lowered in respect to a vertical plane.

Referring now more particularly to Figs. 1 and 2, I provide intermediate the rod 17 and the motor, a train of gearing preferably comprising the worm 19 mounted on the power shaft 20 and a worm wheel 21 which is meshed with said worm 19. The numeral 22 designates a bull gear which is provided with a driving rod connection 23 with the inner end of the connecting rod 17, and has between it and the worm wheel 21 a series of gearing consisting of a pinion 24, gear 25 and pinion 26, the pinions 24 and 26 being respectively co-axial with the gears 21 and 25. This gear group and the shaft are mounted in a casing D carried by the framework of the truck.

The reference numeral 27 indicates a brake which may desirably be employed on the power shaft 20 in order to check any momentum of the same when the motor has been shut off or disconnected.

In the operation of the mechanism above described and with the parts positioned as shown in Fig. 2, the motor is started by any convenient or desired form of switch mechanism (not shown) and the power is shut off when the bull gear 22 has moved through one hundred and eighty degrees, which would bring its pivot pin 28 in its travel about the axis of the wheel 22 to a position indicated by a reference letter $x$ in Fig. 2. This exerts a pull in the rearward direction on the connecting rod 17 and through the medium of the levers 16 and 15 the platform is raised to elevated position. A further half turn of the gear serves to lower the platform, and at the end of either movement the driving rod is at dead-center.

Organized as it is, the gearing group constitutes a speed reduction medium between the motor and the leverage mechanism, hence the movement of the driving rod being gradual in character is such as to readily permit the operator to disconnect the power when the maximum or minimum movement of the platform has been reached, any shaft momentum being checked upon application of the brake 27. Furthermore, it will be apparent that with the power disconnected, load pressure from the platform is neutralized by the inertia of the worm 19, and in a secondary degree by the dead-centering of the bull gear and driving rod connection which occurs precisely at the time of maximum and minimum platform movement. In this way the platform is locked when under load and in a manner designed to relieve the motor of load thrust when disconnected.

What I claim is:

1. In an elevator truck, the combination of a truck body comprising spaced side frame members, a liftable load receiving platform, means for raising and lowering the platform, gearing mounted on one side frame member at the forward end of the truck, a crank device mounted on the other side frame member, a transverse shaft geared at the ends to said gearing and said crank device, a connecting rod for operating the said means for raising and lowering the platform connected to the crank device between the same and the said gearing, and a motor for driving said gearing, said motor being mounted on the top of the frame.

2. In an elevator truck, the combination of a truck frame comprising two side members spaced relatively closely together in the rear portion of the truck and having forward portions elevated and spaced wider apart with respect to said rear portions, an elevating motor carried on the said elevated portion, speed reducing gearing and operating mechanism between the elevated forward portions of the side frame members, a rearwardly extending connecting rod between the side frames, a liftable platform carried on the rear portion of the truck and means operated by the connecting rod for raising and lowering the platform.

3. In an elevator truck, the combination of a truck body comprising spaced side frame members, a liftable load receiving platform, pairs of work levers for raising the platform, a shaft for carrying each pair of such work levers mounted on the upper face of the frame members, the levers being carried at points outside the frame and an operating crank for each shaft carried at a point between the frame members.

WALTER C. DYER.